Jan. 7, 1936: J. M. YOUNG 2,026,602
APPARATUS FOR CANNING
Filed Jan. 1, 1931 2 Sheets-Sheet 2
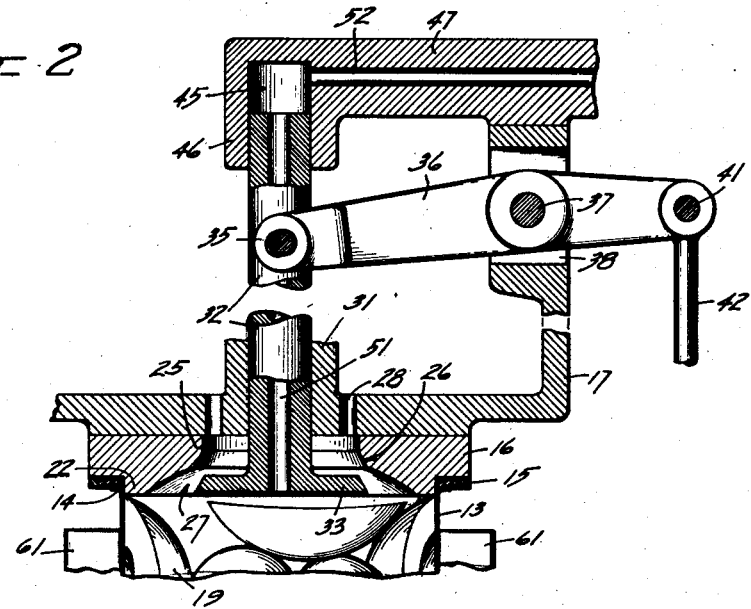
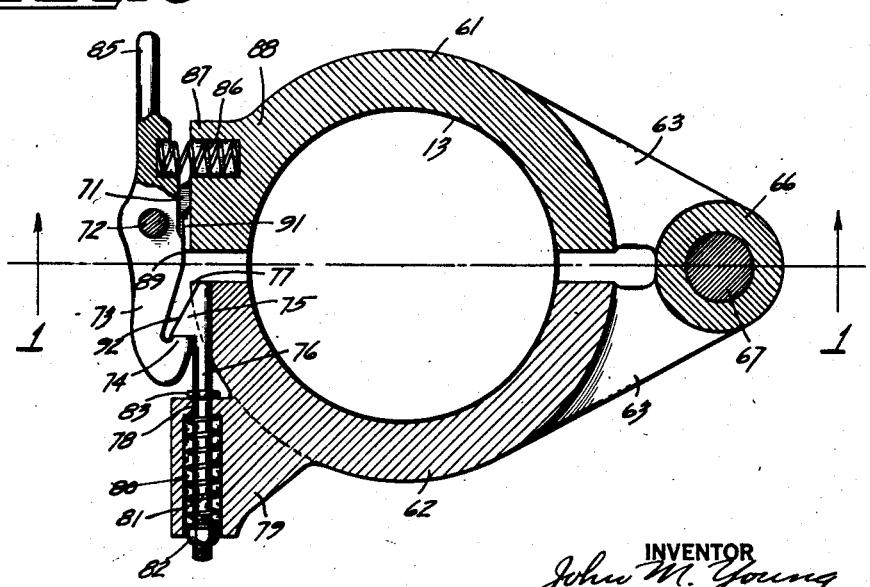
INVENTOR
John M. Young
BY
John C. Carpenter
ATTORNEY Patented Jan. 7, 1936

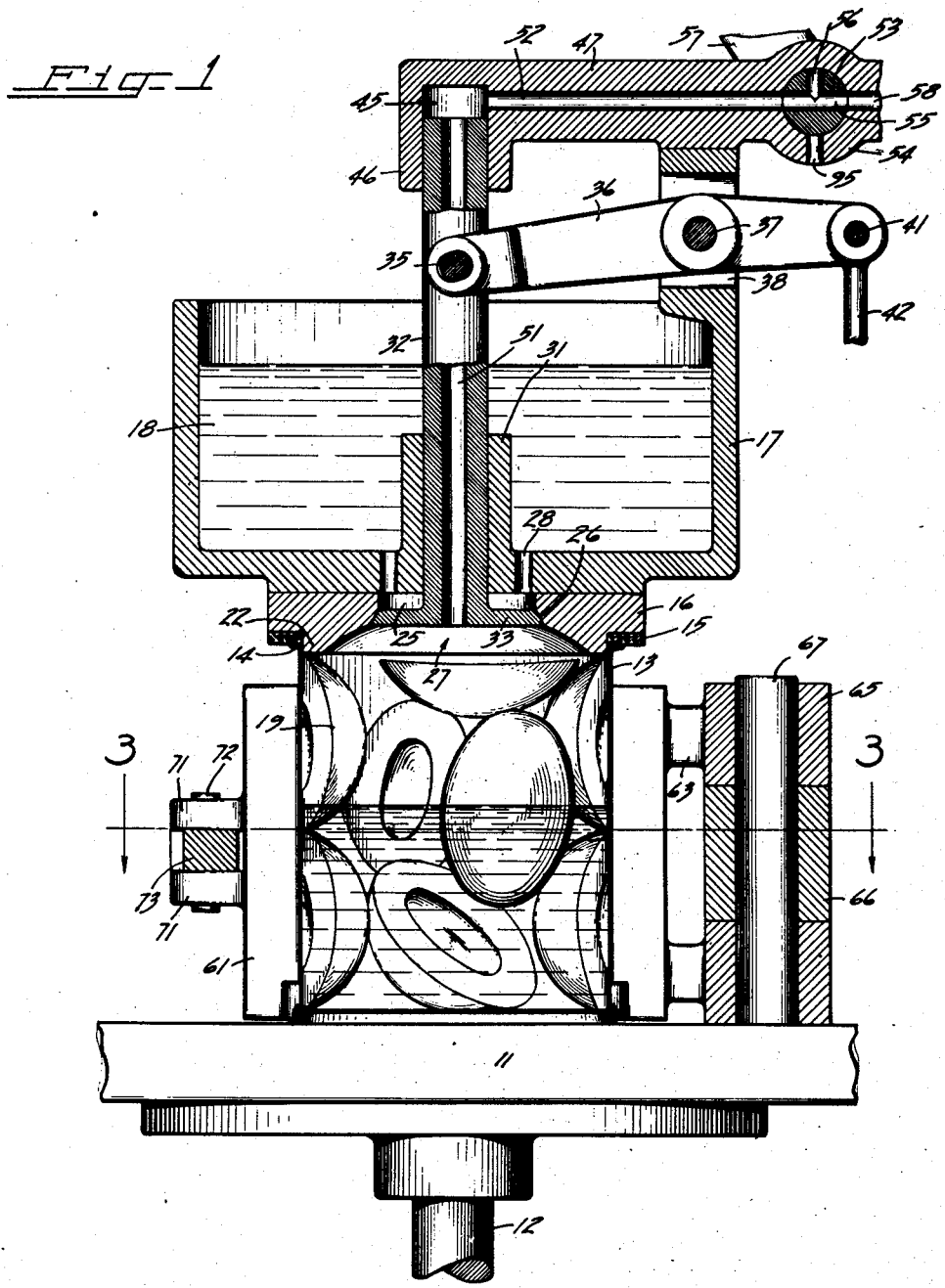

2,026,602

UNITED STATES PATENT OFFICE 2,026,602

APPARATUS FOR CANNING

John M. Young, Brooklyn, N. Y., assignor to American Can Company, New York, N. Y., a corporation of New Jersey Application January 1, 1931, Serial No. 505,999

6 Claims. (Cl. 226—116)

The present invention relates to vacuum canning and has particular reference to the protection of the container used for the product being canned during high vacuumization of the same.

The use of a relatively high vacuum, such as 27" and more, has been found to give highly beneficial canning results particularly with some products of a cellular nature, such as fresh fruits, these results not being obtainable without vacuum or with only low vacuum. In commercially canning products in the ordinary tin can and with high speed, it is desirable to vacuumize only the interior of the can and its exterior walls are subjected to the force of atmospheric pressure which tends to collapse the container unless provision is made to prevent it.

The present invention contemplates holding a sufficient part of the exterior can walls during vacuumization so that the pressure of the surrounding atmosphere can not substantially distort or change the shape of the container.

In other words, this invention contemplates the retention of the original can shape by preventing outward movement of its wall sections to such extent that would otherwise allow a corresponding inward movement of a magnitude sufficient to cause collapse. The method contemplates certain steps of procedure which may be used with any of the regular canning operations, the step of syruping a container filled with a cellular product being selected as an example of one adaptation of the invention to canning.

The principal object of the present invention is the provision of an improved apparatus for retaining the walls of containers in their original shape and condition to prevent the destructive influence of exterior atmospheric pressure during high vacuumization of their interiors.

A further important object of the invention is an improvement in canning under high vacuum wherein the exterior walls of the container being vacuumized are prevented from moving outwardly and therefore any corresponding inward movement is prevented which might otherwise result in crushing of the container by the outside atmospheric pressure.

Numerous other objects of the invention will be apparent as it is better understood from the following description, which, taken in connection with the accompanying drawings, discloses a preferred embodiment thereof.

Referring to the drawings:—

Figure 1 is a vertical sectional view, largely schematic, of the principal elements of an apparatus adaptable to carrying out steps in the present invention, the view being taken substantially along a center line indicated as 1—1 in Fig. 3;

Fig. 2 is a fragmentary showing of parts of the apparatus as disclosed in Fig. 1, but in a different position; and Fig. 3 is a plan sectional view taken substantially along the line 3—3 in Fig. 1.

The present invention contemplates protecting a container during certain canning operations and will be herein described in connection with an apparatus adapted for its practice. For this purpose there is disclosed elements of a syruping device combined with means for vacuumizing the interior of the container.

Such an apparatus comprises a baseplate 11 carried on the upper end of a stem 12 by means of which the baseplate is raised and lowered. A container 13 which may preferably be the ordinary tin can is provided for the product to be canned and after the can has been filled with the product it is placed upon the baseplate 11. This baseplate and its superimposed filled can is then lifted until an upper flange 14 of the can is brought into sealing engagement with a gasket ring 15 preferably of rubber or other similar material carried in a vacuum head 16.

The head 16 is secured to the bottom of a tank or vessel 17 adapted to hold a liquid 18. This tank constitutes a part of a syruping apparatus, the liquid 18 being syrup, brine or other liquid which is later put into the can already supplied with its solid contents. This content is designated by the numeral 19, and may be a cellular product such as fruit.

In the canning of some products, it is sometimes advisable to partially fill the can with syrup before it is vacuumized and in Fig. 1 such partial filling is illustrated. In this way spilling or boiling over of the liquid in the can is prevented when the vacuum is being applied to the can's interior.

The head 16 is provided with a circular projection 22 which extends below the lower surface of the gasket 15 and is of a proper size to loosely fit within the open end of the container as it is brought into sealing contact with the gasket 15 by raising of the plunger 11. This supports the relatively fragile open end of the can when it is being vacuumized.

The head 16 is also provided with a center opening 25, a part of the surrounding walls of which are shaped to provide a valve seat 26, the opening 25 communicating at its lower end, through the valve opening, with a chamber 27 which in turn communicates with the interior of the can 13. Vertical openings 28 cut through the floor of the tank 17, form communicating passageways for the syrup and permit, at certain times, its flow from the tank into the can.

An apertured boss 31 extends upwardly from the bottom of the tank 17 and provides a bearing for a vertically sliding valve stem 32 enlarged at its lower end to provide a valve head 33 which cooperates with the valve seat 26, when in raised position, to shut off communication between the openings 25 and 27. The upper end of the stem 32 is loosely connected at 35 to one end of a lever 36 pivoted on a shaft 37 carried by a bracket 38 extending upwardly from one of the walls of the tank 17. The opposite end of the lever 36 is pivotally connected at 41 to an actuating rod 42 which is raised and lowered in proper time to open and close the valve 33.

The upper end of the valve stem 32 extends into and has sliding movement within a channel 45 formed interiorly of a boss 46 which is an integral part of a longitudinally extending frame 47 mounted on and carried by the bracket 38. A vertical passageway 51 extends through the valve stem 32 and communicates at its lower end with the opening 27 in the head 16 and at its upper end with the channel 45. A horizontal passageway 52 is formed interiorly of the frame 47 and communicates at one end with the channel 45 and at the other end with a three-way valve 53 located in a valve seat 54 formed in the frame 47.

The valve 53 is provided with a passageway 55 which extends along its diameter and connects with a radially extending passageway 56. This valve 53 is adapted to be moved into any of its three positions by an operating lever 57. In the position illustrated in Fig. 1, passageway 55 provides an inter-communication between one end of the passageway 52 and a passageway 58 leading from any suitable source of vacuum supply.

The original shape of the can wall is preserved during vacuumization and filling by a device which prevents outward distortion of the can wall. Being so held there can not be any inward distortion such as would otherwise result, in a magnified form at least, in the collapse of the can. This device, as illustrated in the drawings, comprises a pair of semi-circular jaws 61, 62 provided with arms 63, 64 having pintle lugs 65, 66 movably connecting with a vertical stud 67 carried by the baseplate 11. Such a hinged construction permits movement of the jaws which, in an open position, allows for positioning of the filled can 13 on the baseplate 11 and in closed position retains the original shape of the can wall.

Provision is made for holding the jaws in their closed position (Fig. 3) this being the position assumed during vacuumizing and syruping of the container. For this purpose the jaw 61 is formed with projecting lugs 71 which support a pivot pin 72 on which is pivotally mounted a latch member 73. This latch member is provided with a hooked end 74 which is adapted to engage a hook shaped head 75 of a catch rod 76.

The rod 76 has slight sliding movement within a groove 77 cut in the outer wall of the jaw 62 and in a bore 78 cut in an adjacent enlarged section or boss 79 formed in the jaw. A counterbore 80 is formed in the boss 79 the end of the rod 76 extending therein. This counterbore accommodates a spring 81 which surrounds the rod 76 and is held thereon by a locknut 82. A cotter pin 83 inserted through the rod 76 outside of the boss 79 provides a stop for holding the rod 76 in place when it is under the full influence of the spring 81.

The latch member 73 has a handle 85 by which it may be rocked on its pivot to release it from the catch head 75. A spring 86 is located in a bore 87 formed in an enlarged section 88 of the jaw 61 and normally holds the latch member 73 with its hooked end 74 in catch engaging position. When under the full influence of the spring 86 a shoulder 89 of the latch member strikes against a stop 91 formed in the section 88 of the jaw 61 and limits the inward position of the latch member.

With the can 13 in position under the head 16 the jaws 61, 62 are brought toward each other and into engagement with the wall of the can. The hooked end 74 of the latch member 73, during this jaw closing action, rides over an inclined surface 92 formed on the catch head 75 and moves therealong into engaged or latched position, as illustrated in Fig. 3. A substantial part of the exterior wall of the can is thus engaged and is held in its original shape. In the case of a round can, as herein illustrated, the rotundity of the can is preserved by this wall engagement.

It will be observed that the bores 61, 62 do not entirely enclose the circumference of the can. This is unnecessary as sufficient of the exterior wall is engaged to prevent any substantial outward movement of the wall. There can, therefore, be no corresponding inward movement of the can wall.

The filled can 13 positioned and clamped as illustrated in Fig. 1 is now ready for the vacuumizing operation. The lever 67 of the 3-way valve is thereupon operated to connect the passageway 52 with the source of vacuum 58 by means of a passageway 55 in the valve, this position being also shown in Fig. 1. Air is thereupon withdrawn from the interior of the can through the passageways 51, 52, 55 and 58 and a high vacuum established in the interior of the container.

The can may then be filled with syrup 18 from the tank 17, this filling action preferably beginning before the vacuumizing step has been entirely completed. To effect such a liquid filling, the rod 42 is operated in a suitable manner to rock the lever 36 on its pivot 37 and lower the valve stem 32 and the valve 33 which action opens communication between the chambers 25 and 27. Syrup thereupon flows from the tank 17 through the openings 28 and chamber 25 and into the interior of the can.

The can 13, not being in a vacuum chamber, is subjected exteriorly to atmospheric pressure, by reason of the reduced pressure on the interior of the container, and such a pressure tends to crush the can wall inwardly. This action, however, is prevented by the jaws 61, 62 which do not allow the can wall to move out of its original shape or rotundity. The minimum area of can wall engaged by the jaws will be governed by the shape and size of the can and by the strength of the can wall but must at all times be sufficient to prevent the wall from moving out of round or out of its normal shape sufficiently to allow collapse.

After vacuumizing the valve 53 may be shifted to cut off communication between the passageways 52 and 58 and the passageway 56 may then be brought into alignment with the end of the passageway 52. Passageway 55 will then extend in a vertical position and one end thereof will connect with a passageway 95 formed in the valve member 54 and leading to the outside of the valve casing. Air from the exterior atmosphere then enters the passageways 95, 55, 56, 52 and 51 and breaks the vacuum on the interior of the can 13. The exact time when this breaking of the vacuum takes place will vary with the canning procedure used.

When the operation of vacuumizing and syruping has been completed and the can is ready to be removed from the head 16, the latch member 73 is disconnected from the catch member 75 by pressure on its handle 85 and the jaws 61, 62 are swung backward on their pivot 67 sufficiently to clear the container 13. Lowering of the baseplate 11 which follows then carries the can with it and removes it from the head 16.

It is thought that the invention and many of its attendant advantages will be understood from the foregoing description, and it will be apparent that various changes may be made in the form, construction, and arrangement of the devices mentioned herein and in the steps and their order of accomplishment of the process described herein, without departing from the spirit and scope of the invention or sacrificing all of its material advantages, the forms and processes hereinbefore described being merely a preferred embodiment thereof.

I claim:

1. Apparatus for canning under vacuum, comprising in combination: a vacuum head connected with a source of vacuum, means for controlling said vacuum, means for supporting a partially filled can to be vacuumized in operative relation to said head, a syrup tank communicating with said vacuum head, a valve member mounted in said head for controlling the supply of syrup to said can, and means pivotally mounted on said can supporting means and movable into and out of engagement with the side walls of said can to support the latter against collapse when the vacuum is drawn, said pivotally mounted means substantially conforming to the cross-sectional configuration of the can when in can engaging position.

2. Apparatus for canning under high vacuum, comprising in combination: a vacuum head connected with a source of vacuum, means for controlling said vacuum, means for supporting a partially filled can to be vacuumized in operative relation to said head, a syrup tank communicating with said vacuum head, a valve member mounted in said head for controlling the supply of syrup to said can, and a plurality of jaw members together conforming to the cross-sectional configuration of the can pivotally mounted adjacent the can to be vacuumized and movable into and out of snug engagement with the side walls of said can to support the latter against collapse when the vacuum is drawn.

3. Apparatus for canning under high vacuum, comprising in combination: a vacuum head connected with a source of vacuum, means for controlling said vacuum, means for supporting a partially filled can to be vacuumized in operative relation to said head, a syrup tank communicating with said vacuum head, a valve member mounted in said head for controlling the supply of syrup to said can, and a plurality of jaw members together conforming to the cross-sectional configuration of the can pivotally mounted adjacent the can to be vacuumized and movable into and out of engagement with the side walls of said can to support the latter against collapse when the vacuum is drawn, and means for locking said jaw members together when in position to engage the can side walls.

4. Apparatus for canning under high vacuum, comprising in combination: a vacuum head connected with a source of vacuum, valve means for controlling said vacuum, a movable base plate for supporting a partially filled can to be vacuumized in operative relation to said head, a syrup tank communicating with said vacuum head, a valve member mounted in said head for controlling the supply of syrup to said can, and a plurality of jaw members together conforming to the cross-sectional configuration of the can pivotally mounted on said base plate and movable into and out of engagement with the side walls of said can to support the latter against collapse when the vacuum is drawn.

5. Apparatus for canning under high vacuum, comprising in combination: a vacuum head connected with a source of vacuum, valve means for controlling said vacuum, a vertically movable base plate for supporting a partially filled can to be vacuumized in operative relation to said head, a syrup tank communicating with said vacuum head, a valve member mounted in said head for controlling the supply of syrup to said can, and a plurality of jaw members together conforming to the cross-sectional configuration of the can pivotally mounted on said base plate and movable into and out of engagement with the side walls of said can to support the latter against collapse when the vacuum is drawn, and means for locking said jaw members together when in position to engage the can side walls.

6. Apparatus for canning under vacuum, comprising in combination: a vacuum head connected with a source of vacuum, means for controlling said vacuum, means for supporting a partially filled can to be vacuumized in operative relation to said head, a syrup tank communicating with said vacuum head, a valve member mounted in said head for controlling the supply of syrup to said can, means pivotally mounted on said can supporting means and movable into and out of engagement with the side walls of said can to support the latter against collapse when the vacuum is drawn, said pivotally mounted means substantially conforming to the cross-sectional configuration of the can when in can engaging position, and means for supporting the interior wall of the can adjacent its open end.

JOHN M. YOUNG.